United States Patent
Kitatani

(10) Patent No.: US 10,277,691 B2
(45) Date of Patent: Apr. 30, 2019

(54) COMMUNITY SERVER, COMMUNITY METHOD AND PROGRAM

(71) Applicant: NEC CASIO Mobile Communications, Ltd., Kawasaki-shi, Kanagawa (JP)

(72) Inventor: Kenichi Kitatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 14/413,782

(22) PCT Filed: Apr. 1, 2013

(86) PCT No.: PCT/JP2013/059904
§ 371 (c)(1),
(2) Date: Jan. 9, 2015

(87) PCT Pub. No.: WO2014/010277
PCT Pub. Date: Jan. 16, 2014

(65) Prior Publication Data
US 2015/0163310 A1    Jun. 11, 2015

(30) Foreign Application Priority Data

Jul. 10, 2012 (JP) .................................. 2012-154499

(51) Int. Cl.
*H04L 29/08* (2006.01)
*G06Q 10/10* (2012.01)
*G06Q 50/00* (2012.01)

(52) U.S. Cl.
CPC ............ *H04L 67/22* (2013.01); *G06Q 10/10* (2013.01); *G06Q 50/01* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2008/0040475 | A1* | 2/2008 | Bosworth | G06Q 30/08 709/224 |
| 2008/0225870 | A1* | 9/2008 | Sundstrom | G06Q 10/10 370/401 |

(Continued)

FOREIGN PATENT DOCUMENTS

| | | |
|---|---|---|
| CN | 101079765 A | 11/2007 |
| CN | 102414705 A | 4/2012 |

(Continued)

OTHER PUBLICATIONS

The extended European search report for EP Application No. 13816740.8 dated Oct. 29, 2015.

(Continued)

*Primary Examiner* — Viet D Vu
*Assistant Examiner* — Mohammad Yousuf A. Mian

(57) ABSTRACT

A community server of the present invention includes a monitor that monitors communication states of users, and a controller, in a case where users who previously communicate with each other but who are not linked with each other after the previous communication, that encourages each user to communicate with the counterpart user after passage of a first period since end of the previous communication between the users, and that links the users with each other if the users subsequently communicate with each other.

4 Claims, 5 Drawing Sheets

(56) References Cited

U.S. PATENT DOCUMENTS

| | | | | |
|---|---|---|---|---|
| 2010/0057857 A1* | 3/2010 | Szeto | ............... | H04L 51/04 709/206 |
| 2010/0235886 A1 | 9/2010 | Muller et al. | | |
| 2012/0110075 A1 | 5/2012 | Forrest, Jr. et al. | | |

FOREIGN PATENT DOCUMENTS

| | | | |
|---|---|---|---|
| JP | 2002-099494 | A | 4/2002 |
| JP | 3768791 | B2 | 4/2006 |
| JP | 2009-100789 | A | 5/2009 |
| JP | 2010-199871 | A | 9/2010 |
| JP | 2010-237970 | A | 10/2010 |
| JP | 2011-081670 | A | 4/2011 |
| JP | 2012-003635 | A | 1/2012 |
| JP | 2012-038042 | A | 2/2012 |
| JP | 2011-048589 | A | 3/2013 |
| WO | 20101099632 | A1 | 9/2010 |

OTHER PUBLICATIONS

Extended European Search Report for EP Application No. EP13816740.8 dated Jun. 27, 2016.
Chinese Office Action for CN Application No. 201380031220.4 dated Sep. 29, 2016 with English Translation.
Studio Survive, Pokemon Battle Revolution Koshiki Kanzen Clear Guide, first edition, Media Factory, Inc., Feb. 16, 2007 (Feb. 16, 2007), p. 90.
International Search Report for PCT Application No. PCT/JP2013/059904, dated Jun. 4, 2013.
Japanese Office Action for JP Application No. 2016-217852 dated Oct. 31, 2017 with English Translation.
Chinese Office Action for CN Application No. 201380031220.4 dated Aug. 3, 2018 with English Translation.

* cited by examiner

COMMUNITY SERVER, COMMUNITY METHOD AND PROGRAM

This application is a National Stage Entry of PCT/JP2013/059904 filed on Apr. 1, 2013, which claims priority from Japanese Patent Application 2012-154499 filed on Jul. 10, 2012, the contents of all of which are incorporated herein by reference, in their entirety.

TECHNICAL FIELD

The present invention relates to a community server, a community method, and a program.

BACKGROUND ART

In recent years, the number of community services typified by the SNS (Social Networking Service) has increased. Functions of the community services include one to link users with one another. For example, on a site screen for a given user, user IDs or the like of other users linked with the user are displayed.

Possible methods for linking users with one another include a method of causing each user to perform an operation for linking for oneself. However, the user tends to care about whether the user may give a favorable impression to another counterpart user when the user performs the operation for linking the user with the counterpart user on one's own. This is one reason why, based on actual situations, user will not decide to link or delink with others actively.

It may be therefore desirable that the linking and delinking of users are automatically performed on the part of a community server that provides a community service. As techniques therefore, for example, Patent Literatures 1~3 disclose techniques for delinking users who have not communicated messages or the like for a certain period on the part of the community server.

CITATION LIST

Patent Literature

Patent Literature 1: JP2009-100789A
Patent Literature 2: JP2010-237970A
Patent Literature 3: JP2011-048589A

SUMMARY OF INVENTION

Technical Problem

Meanwhile, in the SNS, after the users communicate messages or the like with each other for the first time, the users are not linked. Owing to this, the users are unable to refer to the user ID of their counterpart.

In this case, although it is necessary to link the users with each other by the communication of messages or the like between the users at a later time in order that the users may refer to the user ID of their counterpart, a possibility of such an occasion is very small.

Therefore, a demand rises for a technique which can easily link users with each other at a later time if the users have already communicated messages or the like but have not been linked with each other.

However, the techniques disclosed in Patent Literatures 1~3 are disadvantageously unable to meet the above-described demand.

Therefore, an object of the present invention is to provide a technique which can solve the above-described problems and which can easily link users with each other at a later time if the users have communicated messages or the like but have not been linked with each other.

Solution to Problem community server of the present invention includes:
a monitor that monitors communication states of users; and
a controller that, in a case where users who previously communicate with each other but who are not linked with each other after the previous communication, encourages each user to communicate with the counterpart user after passage of a first period since end of the previous communication between the users, and links the users with each other if the users subsequently communicate with each other.

A community method of the present invention implemented by a community server, the community method includes:
a monitoring step of monitoring communication states of users; and
a controlling step of, in a case where users who previously communicate with each other but who are not linked with each other after the previous communication, encouraging each user to communicate with the counterpart user after passage of a first period since end of the previous communication between the users, and linking the users with each other if the users subsequently communicate with each other.

A program of the present invention causes a community server to execute:
a monitoring procedure of monitoring communication states of users; and
a controlling procedure of, in a case where users who previously communicate with each other but who are not linked with each other after the previous communication, encouraging g each user to communicate with the counterpart user after passage of a first period since end of the previous communication between the users, and linking the users with each other if the users subsequently communicate with each other.

Advantageous Effect of Invention

According to the present invention, it is possible to provide an advantageous effect of easily linking users at a later time if the users previously communicate messages or the like but are not linked with each other.

DESCRIPTION OF EMBODIMENT

An exemplary embodiment of the present invention will be described in detail below with reference to the drawings.

Figure 1:
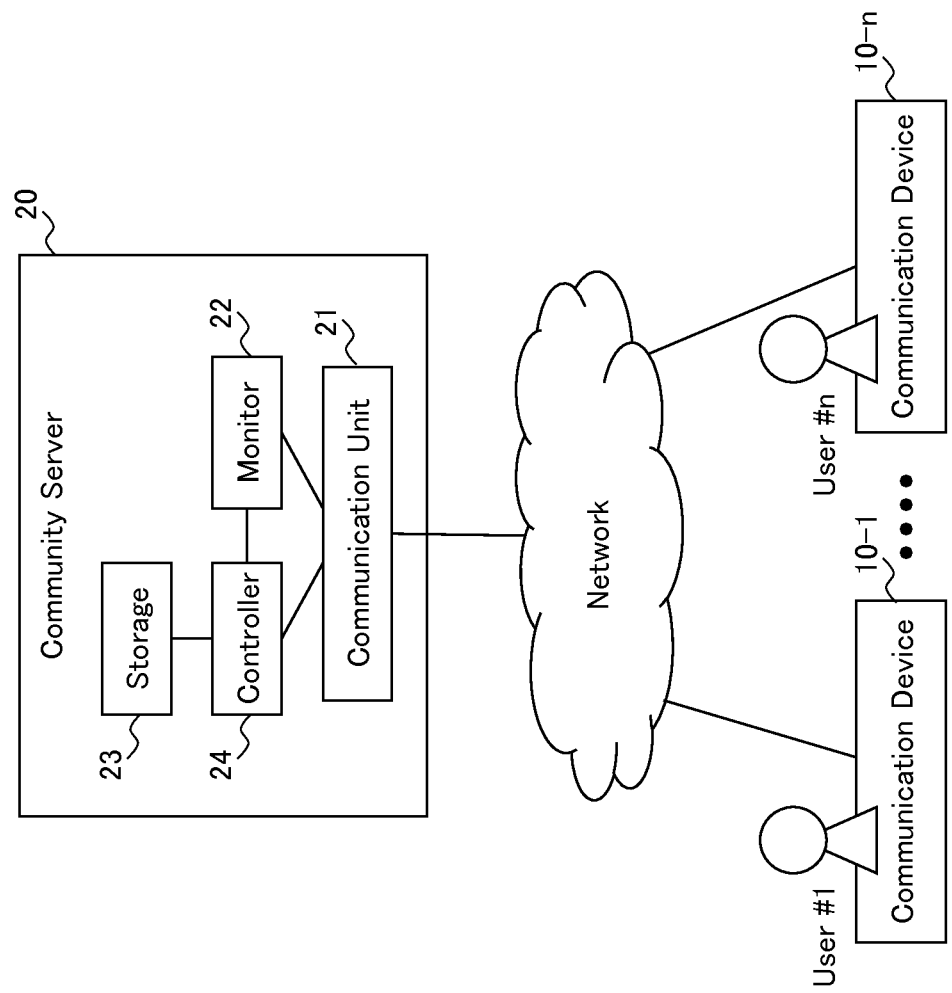
FIG. 1 is a block diagram illustrating a configuration of a community system in one exemplary embodiment of the present invention.

As illustrated in FIG. 1, the community system of the present exemplary embodiment includes n communication devices 10-1~10-n respectively used by users #1~#n (where n is a natural number of 2 or greater) and community server 20 provides a community service to users #1~#n.

While each user can participate in the community service provided by community server 20 using an arbitrary communication device, it is assumed in the following description that users #1~#n participate in the community service using respective communication devices 10-1~10-n as illustrated in FIG. 1 for convenience of description.

Community server 20 includes communication unit 21, monitor 22, storage 23 and controller 24.

Communication unit 21 holds wireless communication with communication devices 10-1~10-n via a network.

Monitor 22 monitors the communication state of each of users #1~#n, the browsing state of a user ID and user related information (such as a profile (such as sex, age and residence)) of each of users #1~#n, the browsing state of a communication record of each of users #1~#n, and the location of each of communication devices 10-1~10-n. Note that it is assumed that the location of each of communication devices 10-1~10-n is monitored using location information transmitted from each of communication devices 10-1~10-n. Further, each of communication devices 10-1∞10-n may transmit the location information regularly or at any timing which is not particularly limited.

Storage 23 stores the user ID and user related information of the user, the communication device used by the user, and the like for each of users #1~#n. Further, if the users are linked with each other, storage 23 stores linking of the users. While an arbitrary method of storing the linking may be used, a possible method is one in which a list of user IDs of the other users linked with the user is stored for the user ID of each user.

Controller 24 performs overall control for providing the community service.

For example, controller 24 links or delinks the users who have participated in the community service. For example, if controller 24 links the users, controller 24 instructs storage 23 to store the linking. Meanwhile, if controller 24 delinks the users, controller 24 instructs storage 23 to delete the linking.

Further, if each user participates in the community service, controller 24 generates a site screen for the user. At this time, controller 24 determines whether the user is linked with the other users by referring to storage 23. If the user is linked with the other users, controller 24 describes the user ID, the user related information, and the like of each of the other users linked with the user on the site screen. The user communicates a message, browses for the IDs and related information for each of the other users, browses the record of communication between himself/herself and the other user, and the like on the site screen.

Operation of the community system in the present exemplary embodiment will be described below.

It should be noted that the present invention is characterized by operation for linking users, and there is no particular limitation on an operation for delinking users. For example, as disclosed in Patent Literature 1 to Patent Literature 3, it is possible to delink those users who do not communicate messages or the like for a certain period.

Therefore, the operation for linking the users, which is the characteristic operation performed by the community system in the present exemplary embodiment will be described below.

Further, operation will be described below by referring to examples where user #1 (user ID: aaa) using communication device 10-1 and user #2 (user ID: bbb) using communication device 10-2 are linked with each other.

(1) Operation Example 1

Figure 2:
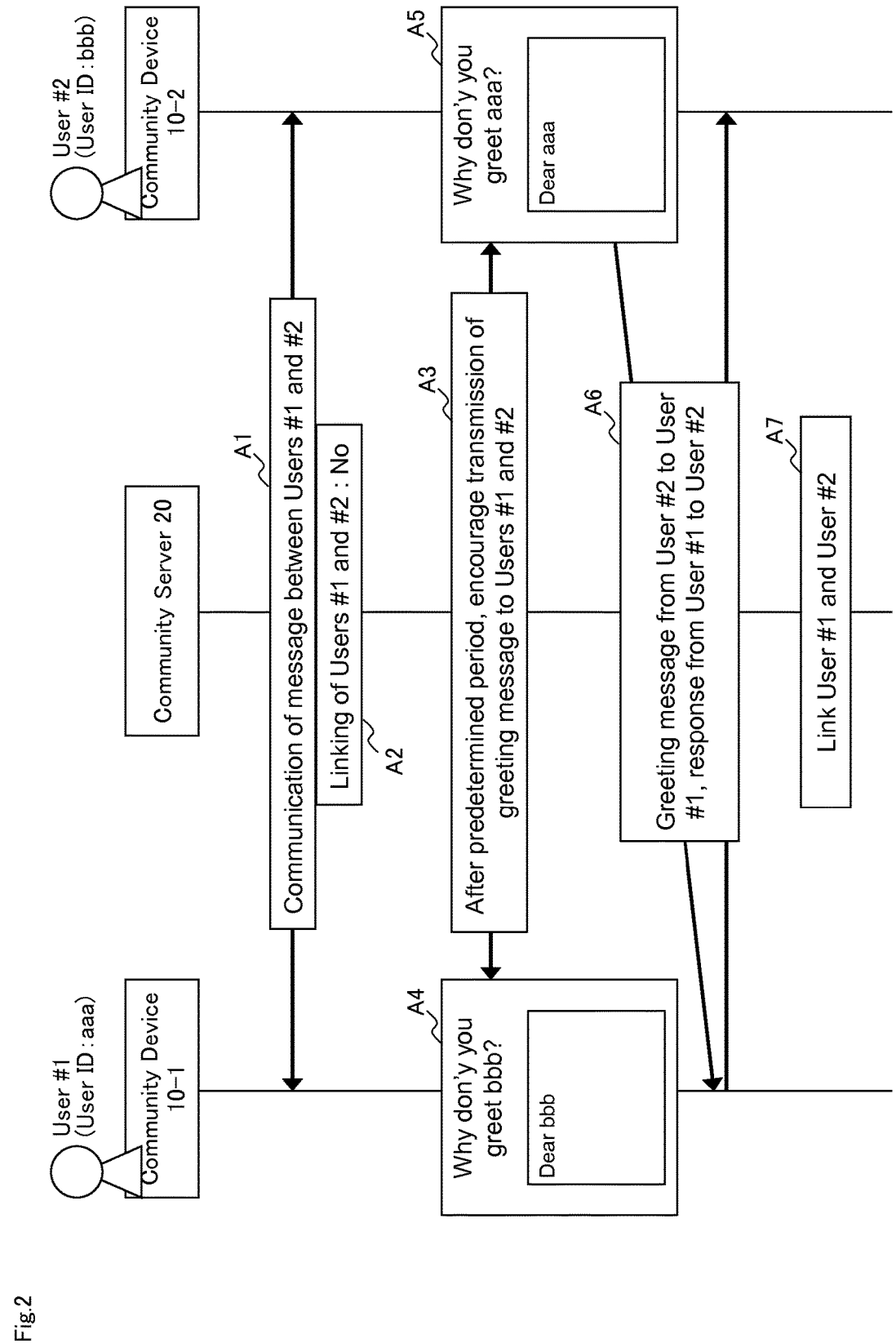
FIG. 2 is a sequence diagram explaining operation example 1 of the community system illustrated in FIG. 1.

As illustrated in FIG. 2, it is assumed in operation example 1 that while communication devices 10-1 and 10-2 of users #1 and #2 previously communicate some kind of messages with each other (step A1), users #1 and #2 are not linked with each other after the communication (step A2).

Controller 24 of community server 20 encourages communication devices 10-1 and 10-2 of users #1 and #2 to transmit greeting messages to the counterpart users after passage of a predetermined period (a first period) since the end of the communication of the messages between communication devices 10-1 and 10-2 of users #1 and #2 (steps A3 to A5).

Subsequently, it is assumed that as a result of the monitoring of monitor 22 of community server 20 for communication states of communication devices 10-1 and 10-2 of users #1 and #2, a greeting message is transmitted from communication device 10-2 of user #2 to communication device 10-1 of user #1 and, in reply, a response message is transmitted from communication device 10-1 of user #1 to communication device 10-2 of user #2 (step S6).

Figure 3:
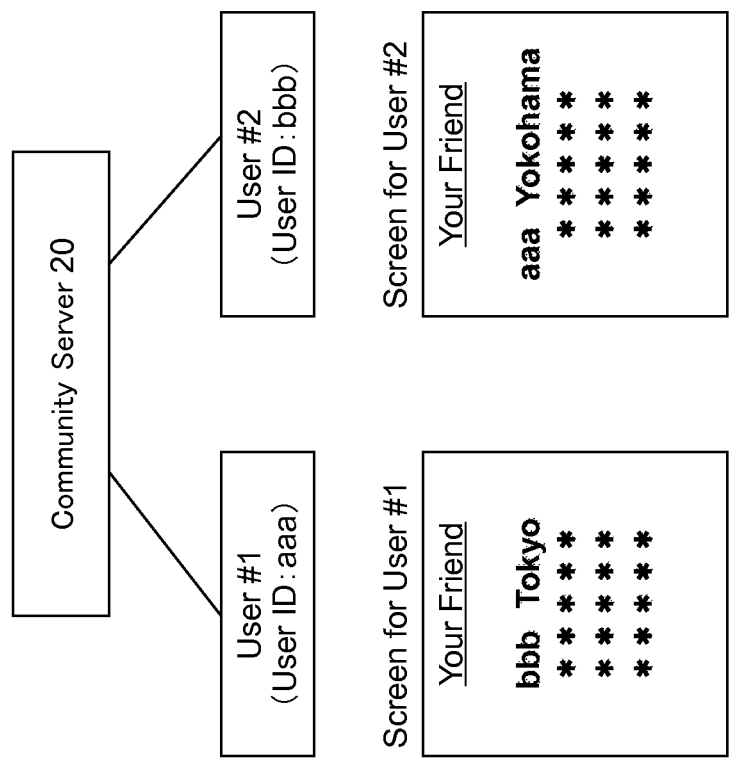
FIG. 3 is a diagram explaining an example of a site screen for linked users in the community system illustrated in FIG. 1.

In this case, controller 24 of community server 20 links users #1 and #2 with each other (step A7). FIG. 3 illustrates an example of site screens for users #1 and #2 thereafter.

In FIG. 2, the users are linked with each other as a result of the transmission of the greeting message from one user and, as a result of the transmission of the response message from the other user. However, the present invention is not limited to this example, and users may be linked with each other as a result of the transmission of greeting messages from the users to each other. That is, in the present invention, the users may be linked with each other as a result of communication between the users.

As described above, in operation example 1, it is possible to provide an advantageous effect in which, even if users #1 and #2 previously communicate messages or the like but are not linked with each other, users #1 and #2 can be easily linked with each other at a later time by encouraging users #1 and #2 to transmit greeting messages.

(2) Operation Example 2

Figure 4:
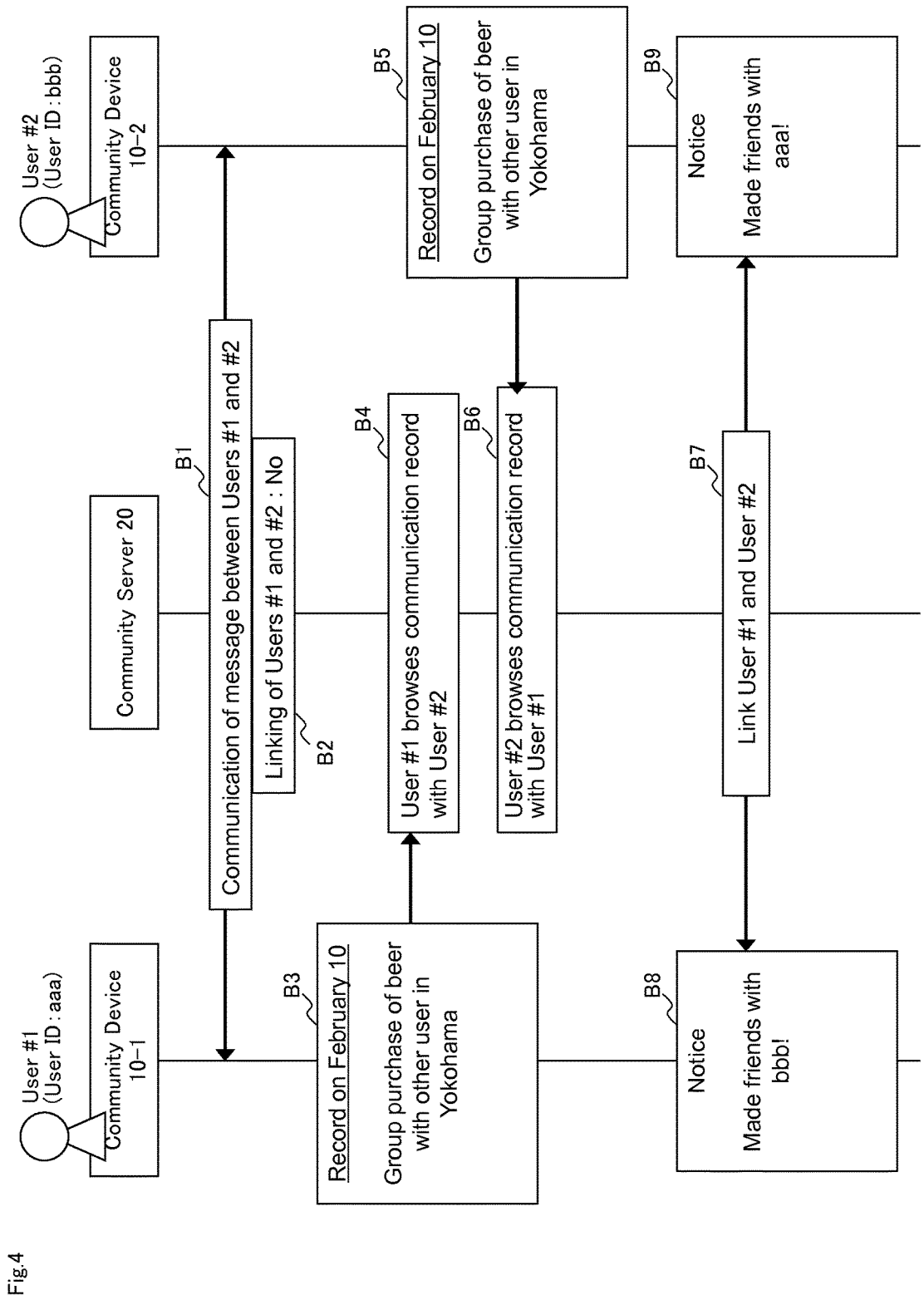
FIG. 4 is a sequence diagram explaining operation example 2 of the community system illustrated in FIG. 1.

As illustrated in FIG. 4, in operation example 2, as with operation example 1, it is assumed that while communication devices 10-1 and 10-2 of users #1 and #2 previously communicate some kind of messages with each other (step B1), users #1 and #2 are not linked with each other after the communication (step B2).

It is assumed herein that as a result of the monitoring of monitor 22 of community server 20 for browsing states of communication devices 10-1 and 10-2 of users #1 and #2, a communication record with user #2 is browsed on communication device 10-1 of user #1 (steps B3 and B4) and a communication record with user #1 is browsed on communication device 10-2 of user #2 (steps B5 and B6) within a predetermined period (a second period; second period first period) communication of messages between user #1 and #2 has ended.

In this case, controller 24 of community server 20 links users #1 and #2 with each other (step B7), and notifies communication devices 10-1 and 10-2 of users #1 and #2 of the linking of users #1 and #2 (steps B8 and B9).

In FIG. 4, the users are linked with each other as a result of browsing of the communication record between each user and each user's counterpart. However, the present invention is not limited to this example. Alternatively, it is possible to link the users with each other as a result of the communication between the users. For example, if each user browses the record of communication between himself/herself and the counterpart user and is encouraged to transmit a greeting message to the counterpart user, then one user transmits a greeting message and, in response, the other user transmits a response message, or the users transmit greeting messages to each other.

As described above, in operation example 2, it is possible to provide an advantageous effect in which even if users #1 and #2 previously communicate messages but are not linked with each other, users #1 and #2 can be easily linked with each other at a later time because the users are linked because, by chance, each of users #1 and #2 browses the communication record between himself/herself and the counterpart user.

(3) Operation Example 3

Figure 5:
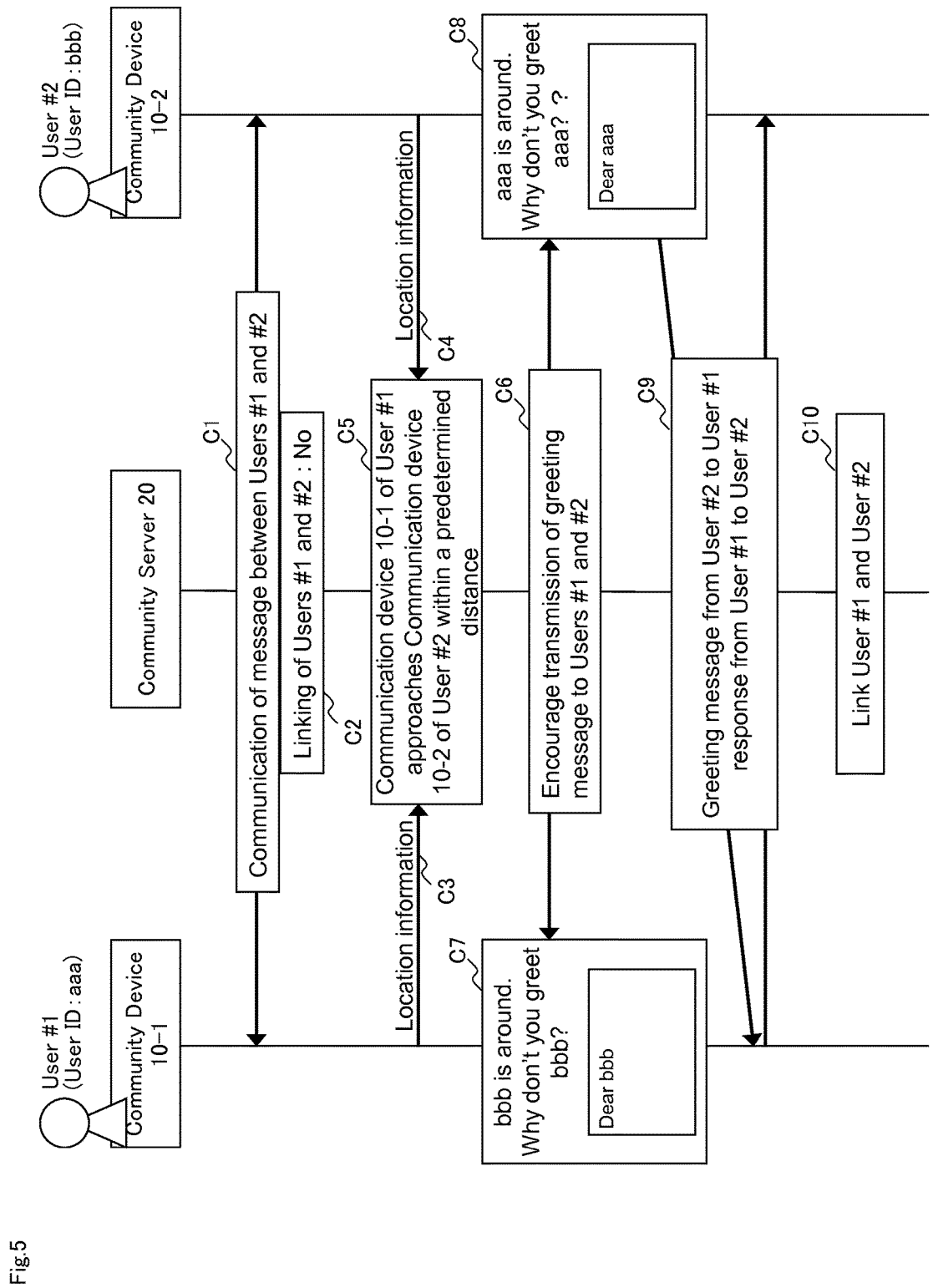
FIG. 5 is a sequence diagram explaining operation example 3 of the community system illustrated in FIG. 1.

As illustrated in FIG. 5, in operation example 3, as with operation example 1, it is assumed that while communication devices 10-1 and 10-2 of users #1 and #2 previously communicate some kind of messages with each other (step C1), users #1 and #2 are not linked with each other after the communication (step C2).

It is assumed herein that as a result of the monitoring of monitor 22 of community server 20 for location information transmitted from communication device 10-1 of user #1 (step C3) and location information transmitted from communication device 10-2 of user #2 (step C4), communication device 10-1 approaches communication device 10-2 within a predetermined distance (step C5).

In this case, controller 24 of community server 20 encourages communication devices 10-1 and 10-2 of users #1 and #2 to transmit greeting messages to the counterpart users (steps C6 to C8).

Subsequently, it is assumed that as a result of the monitoring of monitor 2 of community server 20 to determine the communication state of each user #1 and #2, a greeting message is transmitted from communication device 10-2 of user #2 to communication device 10-1 of user #1 and, in response, a response message is transmitted from communication device 10-1 of user #1 to communication device 10-2 of user #2 (step C9).

In this case, controller 24 of community server 20 links users #1 and #2 with each other (step C10).

In FIG. 5, the users are linked with each other as a result of the transmission of the greeting message from one user and, in response, the transmission of the response message from the other user. However, the present invention is not limited to this example, and it is also possible to link the users with each other as a result of the mutual transmission of greeting messages. That is, in the present invention, the users may be linked with each other based on the fact that the users perform communication with each other. Alternatively, it is possible to link the users when the communication devices of the users approach each other within the predetermined distance.

As described above, in operation example 3, it is possible to provide an advantageous effect in which even if users #1 and #2 previously communicate messages or the like but are not linked with each other, users #1 and #2 can be easily linked with each other at a later time because users #1 and #2 are linked because, by chance, communication devices 10-1 and 10-2 of users #1 and #2 approach each other within a predetermined distance.

While the present invention has been described so far with reference to the exemplary embodiment, the present invention is not limited to the above-described exemplary embodiment. Various modifications which can be understood by a person skilled in the art can be made to the configuration and details of the present invention within the scope of the present invention.

For example, in operation examples 1~3 of the above-described exemplary embodiment, it is also possible to assume that the users will not be linked with each other and cannot refer to each other's user IDs after the users communicate messages or the like for the first time.

Further, while in operation examples 1~3 of the above-described exemplary embodiment, each user is encouraged to transmit the greeting message to the counterpart user, the present invention is not limited to these examples and it suffices to encourage each user to perform communication with the counterpart user.

Moreover, the method performed at community server 20 of the present invention may be applied to a program for causing a computer to execute the method. Furthermore, the program can be stored in a storage medium or can be provided to an external device via the network.

The present application claims priority based on Japanese Patent Application No. 2012-154499 filed on Jul. 10, 2012, the entire contents of which are incorporated by reference herein.

What is claimed is:

1. A community server comprising:
a non-transitory memory;
a monitor configured to monitor communication states of users; and
a controller configured to store linked data in the non-transitory memory, read the linked data from the non-transitory memory, recommend each user to communicate with a counterpart user after passage of a first period since end of the previous communication between the users in a case where the linked data indicates users who previously communicated with each other but who are not linked with each other after the previous communication, and link the users with each other and update the linked data stored in the non-transitory memory if the users subsequently communicate with each other,
wherein said monitor is further configured to monitor a browsing state of a communication record of each user, and
said controller is further configured to, in a case where users who previously communicate with each other but who are not linked with each other after the previous communication, recommend each user to communicate with the counterpart user if both users browse the communication record with the counterpart user within a second period since the end of the previous communication between the users, and link the users with each other if the users subsequently communicate with each other.

2. The community server according to claim 1, wherein said monitor is further configured to monitor a location of each user, and said controller is further configured to, in a case where users who previously communicated with each other but who are not linked with each other after the previous communication, link the users with each other if communication devices of the users approach each other within a predetermined distance.

3. The community server according to claim 1, wherein said monitor is further configured to monitor a location of a communication device used by each user, and said controller is further configured to, in a case where users who previously communicated with each other but who are not linked with each other after the previous communication, recommend each user to communicate with the counterpart user if the communication devices of the users approach each other within a predetermined distance, and link the users with each other if the users subsequently communicate with each other.

4. A community method implemented by a community server, the community method comprising:

monitoring communication states of users;

recommending, in a case where users who previously communicated with each other but who are not linked with each other after the previous communication, each user to communicate with a counterpart user after passage of a first period since end of the previous communication between the users;

monitoring a browsing state of a communication record of each user;

recommending users who previously communicated with each other but who are not linked with each other after the previous communication to communicate with the counterpart user if both users browse the communication record with the counterpart user within a second period since the end of the previous communication between the users; and linking the users with each other if the users subsequently communicate with each other.

* * * * *